(12) United States Patent
Shi et al.

(10) Patent No.: US 8,325,569 B1
(45) Date of Patent: Dec. 4, 2012

(54) EAMR HEAD HAVING IMPROVED OPTICAL COUPLING EFFICIENCY

(75) Inventors: Zhong Shi, Dublin, CA (US); Zhongyan Wang, San Ramon, CA (US); Shing Lee, Fremont, CA (US); Hongxing Yuan, San Ramon, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 13/169,720

(22) Filed: Jun. 27, 2011

(51) Int. Cl.
*G11B 11/00* (2006.01)

(52) U.S. Cl. .................. 369/13.33; 369/112.27

(58) Field of Classification Search .............. 369/13.33, 369/13.32, 13.24, 13.14, 13.03, 13.02, 13.01, 369/13.12, 112.27, 112.09, 112.01, 13.35; 360/59, 125.31, 125.74; 451/5
See application file for complete search history.

(56) References Cited

U.S. PATENT DOCUMENTS

| | | | |
|---|---|---|---|
| 5,625,729 A | 4/1997 | Brown | |
| 6,275,453 B1 | 8/2001 | Ueyanagi | |
| 6,671,127 B2 | 12/2003 | Hsu | |
| 6,687,195 B2 | 2/2004 | Miyanishi | |
| 6,795,630 B2 | 9/2004 | Challener | |
| 6,834,027 B1 | 12/2004 | Sakaguchi | |
| 6,975,580 B2 | 12/2005 | Rettner | |
| 7,027,700 B2 | 4/2006 | Challener | |
| 7,042,810 B2 | 5/2006 | Akiyama | |
| 7,171,080 B2 | 1/2007 | Rausch | |
| 7,190,539 B1 | 3/2007 | Nibarger | |
| 7,266,268 B2 | 9/2007 | Challener | |
| 7,272,079 B2 | 9/2007 | Challener | |
| 7,330,404 B2 | 2/2008 | Peng | |
| 7,440,660 B1 | 10/2008 | Jin | |
| 7,500,255 B2 | 3/2009 | Seigler | |
| 7,567,387 B2 | 7/2009 | Itagi | |
| 7,580,602 B2* | 8/2009 | Itagi et al. | 385/37 |
| 7,596,072 B2 | 9/2009 | Buechel | |
| 7,649,677 B2 | 1/2010 | Jin | |
| 7,839,497 B1 | 11/2010 | Rausch | |
| 8,116,171 B1* | 2/2012 | Lee | 369/13.01 |
| 8,125,856 B1* | 2/2012 | Li et al. | 369/13.01 |
| 2001/0006435 A1 | 7/2001 | Ichihara | |
| 2001/0017820 A1 | 8/2001 | Akiyama | |
| 2003/0184903 A1 | 10/2003 | Challener | |
| 2003/0198146 A1 | 10/2003 | Rottmayer | |
| 2004/0001420 A1 | 1/2004 | Challener | |
| 2004/0027728 A1 | 2/2004 | Coffey | |
| 2004/0223249 A1 | 11/2004 | Kang | |

(Continued)

FOREIGN PATENT DOCUMENTS

EP 1498878 A2 5/2003

(Continued)

*Primary Examiner* — Ali Neyzari

(57) ABSTRACT

A method and system provide an EAMR transducer having an air-bearing surface (ABS) that resides near a media during use. The EAMR transducer includes a write pole, coil(s), a near field transducer (NFT), a waveguide, and a reflective grating. The write pole writes to a region of the media. The coil(s) energize the write pole. The NFT is proximate to the ABS and focuses the energy onto the media. The waveguide is configured to direct the energy from the laser toward the NFT at an incident angle with respect to the ABS. A first portion of the energy reflects off of the ABS at a reflected angle. The reflective grating receives the first portion of the energy at the reflected angle from the ABS and reflects a second portion of the energy toward the ABS. The NFT resides between at least part of the waveguide and the reflective grating.

20 Claims, 4 Drawing Sheets

U.S. PATENT DOCUMENTS

| | | |
|---|---|---|
| 2004/0228022 A1 | 11/2004 | Ueyanagi |
| 2005/0047013 A1 | 3/2005 | Le |
| 2005/0289576 A1 | 12/2005 | Challener |
| 2007/0081426 A1 | 4/2007 | Lee |
| 2007/0081427 A1 | 4/2007 | Suh |
| 2008/0055343 A1 | 3/2008 | Cho |
| 2008/0180827 A1 | 7/2008 | Zhu |
| 2008/0181560 A1 | 7/2008 | Suh |
| 2008/0198496 A1 | 8/2008 | Shimazawa |
| 2008/0232225 A1 | 9/2008 | Cho |
| 2011/0228651 A1 | 9/2011 | Gage et al. |
| 2011/0228652 A1 | 9/2011 | Gage et al. |
| 2012/0113770 A1 | 5/2012 | Stipe |

FOREIGN PATENT DOCUMENTS

| | | |
|---|---|---|
| EP | 1501076 A1 | 7/2003 |

\* cited by examiner

EAMR HEAD HAVING IMPROVED OPTICAL COUPLING EFFICIENCY

BACKGROUND

FIG. 1 depicts a portion of a conventional energy assisted magnetic recording (EAMR) transducer 10. For clarity, FIG. 1 is not to scale. The conventional EAMR transducer 10 is used in writing a recording media (not shown in FIG. 1) and receives light, or energy, from a conventional laser (not shown in FIG. 1). The conventional EAMR transducer 10 includes a conventional waveguide 12, coil connection 18, a conventional grating 20, a conventional near-field transducer (NFT) 22, and a conventional pole 30. Light from a laser (not shown) is incident on the grating 20, which coupled light to the waveguide 12. Light is guided by the conventional waveguide 12 to the NFT 22 near the air-bearing surface (ABS). In the embodiment shown, the conventional waveguide 12 is a parabolic solid immersion mirror. The NFT 22 focuses the light to magnetic recording media (not shown), such as a disk. In operation, light from the laser is coupled to the conventional EAMR transducer 10 using the grating 20. The waveguide 12 directs light from the grating 12 to the NFT 22. The NFT 22 focuses the light from the waveguide 12 and heats a small region of the conventional media (not shown). The conventional EAMR transducer 10 magnetically writes data to the heated region of the recording media by energizing the conventional pole 30.

Although the conventional EAMR transducer 10 may function, there are drawbacks. A sufficient amount of power from the laser is to be delivered to the media in order to heat the media to a desired temperature. However, without more, the NFT 22, and thus the conventional EAMR transducer 10, may not be able to couple this sufficient energy into the media. Thus, the ability of the conventional EAMR transducer 10 to write to the media may be adversely affected.

Accordingly, what is needed is a system and method for improving optical efficiency and performance of an EAMR transducer.

BRIEF SUMMARY OF THE INVENTION

A method and system provide an EAMR transducer having an air-bearing surface (ABS) configured to reside in proximity to a media during use. The EAMR transducer includes a write pole, coil(s), a near field transducer (NFT), a waveguide, and a reflective grating. The write pole is configured to write to a region of the media. The coil(s) energize the write pole. The NFT is proximate to the ABS and is for focusing the energy onto the region of the media. The waveguide is configured to direct the energy from the laser toward the NFT at an incident angle with respect to the ABS. A first portion of the energy reflects off of the ABS at a reflected angle. The reflective grating is configured to receive the first portion of the energy at the reflected angle from the ABS and to reflect a second portion of the energy toward the ABS. The NFT resides between at least a portion of the waveguide and the reflective grating.

DETAILED DESCRIPTION OF THE EMBODIMENTS OF THE INVENTION

Figure 1:
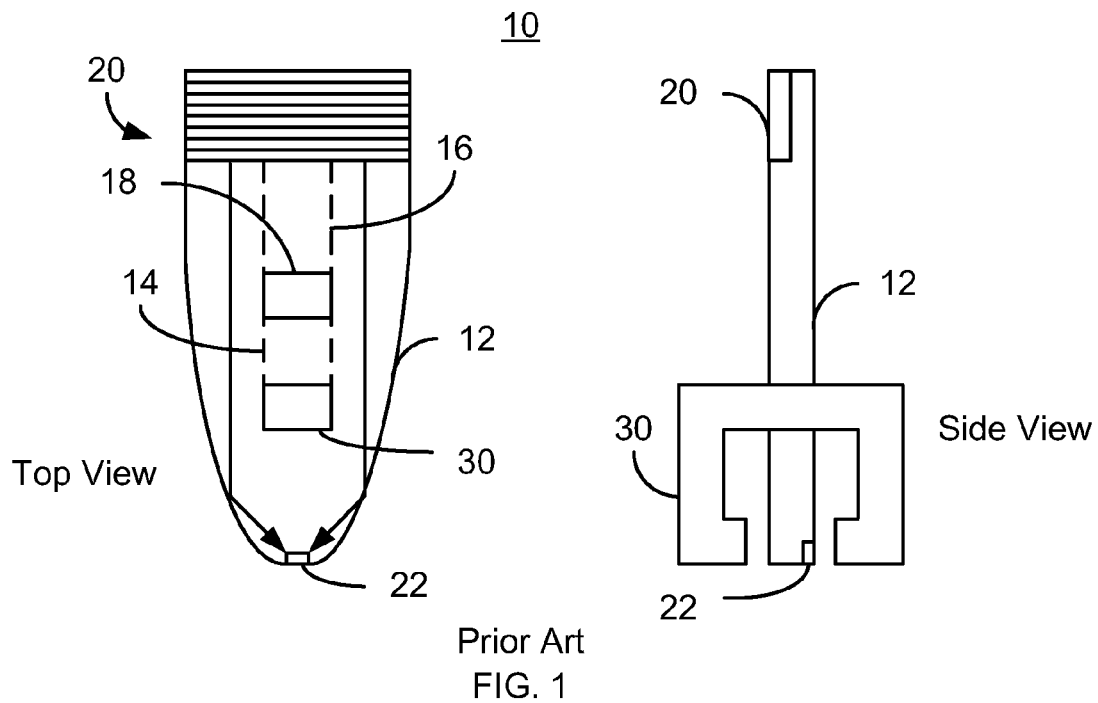
FIG. 1 is a diagram depicting a conventional EAMR transducer.
Figure 2:
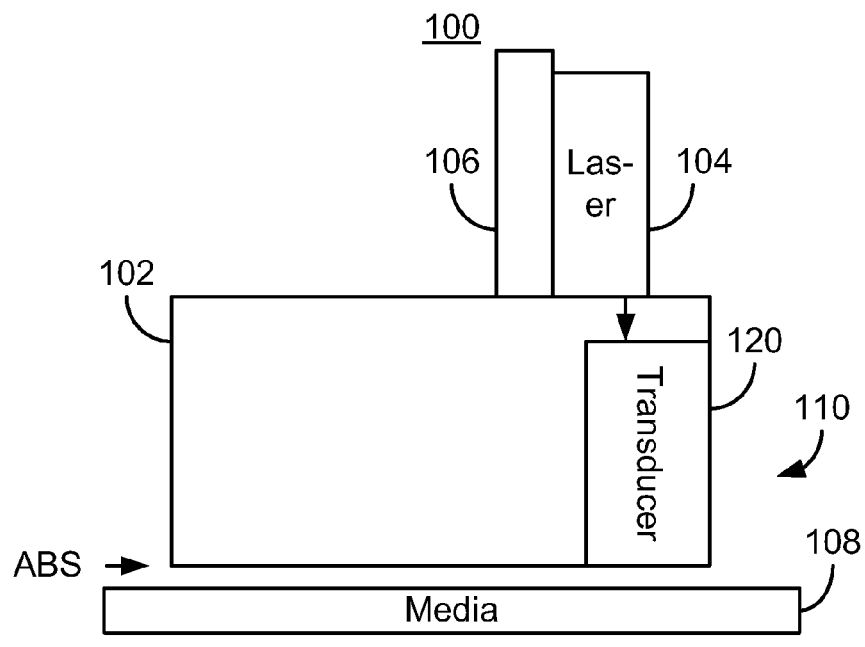
FIG. 2 is a diagram depicting an exemplary embodiment of an EAMR disk drive.

FIG. 2 is a diagram depicting a portion of an EAMR disk drive 100. For clarity, FIG. 2 is not to scale. For simplicity not all portions of the EAMR disk drive 100 are shown. In addition, although the disk drive 100 is depicted in the context of particular components other and/or different components may be used. Further, the arrangement of components may vary in different embodiments. The EAMR disk drive 100 includes a slider 102, a laser/light source 104 that may be coupled to a submount 106, media 108, and an EAMR head 110. In some embodiments, the laser 104 is a laser diode. Although shown as mounted on the slider 102, the laser 104 may be coupled with the slider 102 in another fashion. For example, the laser 104 might be mounted on a suspension (not shown in FIG. 2) to which the slider 102 is also attached. The laser 104 may also be oriented differently and/or optically coupled with the EAMR transducer 120 in another manner. For example, additional optics (not shown) may be included. The media 108 may include multiple layers, which are not shown in FIG. 2 for simplicity.

The EAMR head 110 includes an EAMR transducer 120. The EAMR head 110 may also include a read transducer (not shown in FIG. 2). The read transducer may be included if the EAMR head 110 is a merged head. The EAMR transducer 120 includes optical components (not shown in FIG. 2) as well as magnetic components (not shown in FIG. 2).

Figure 3A:
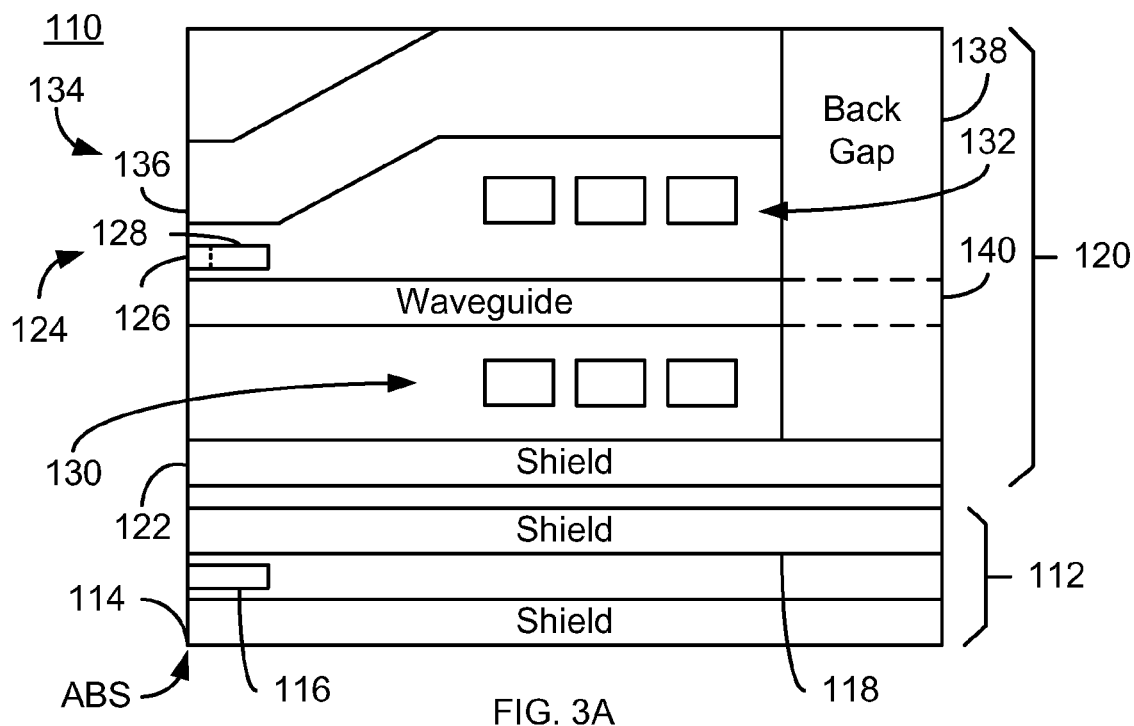
FIGS. 3A and 3B are diagrams depicting top and side views of an exemplary embodiment of an EAMR transducer.
Figure 3B:
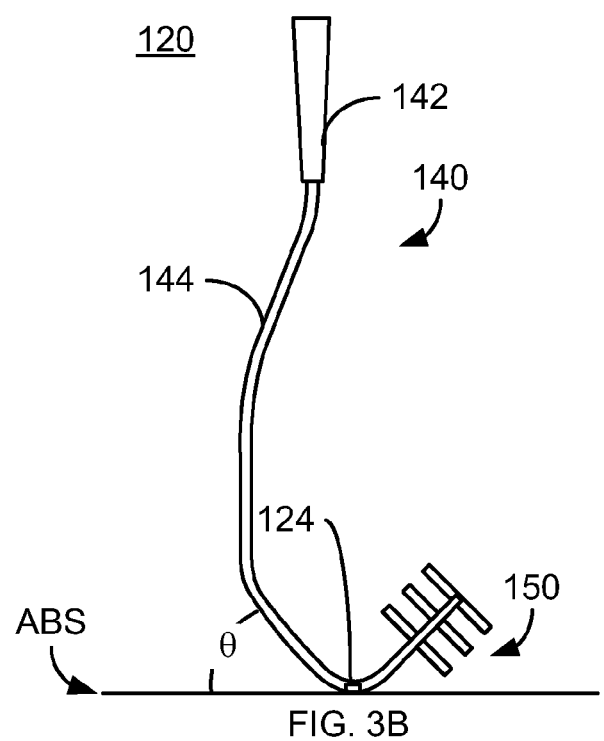

FIGS. 3A and 3B are a diagram depicting side and top views of another exemplary embodiment of the EAMR head 110 shown in FIG. 2. Consequently, analogous components are labeled similarly. For simplicity, FIGS. 3A and 3B are not to scale. In addition, portions of the EAMR transducer 120 may be omitted in FIGS. 3A and 3B. For example a grating that may be used to couple light from the laser 104 into the EAMR transducer 120 is not shown in FIGS. 3A and 3B. Further, particular layers and/or components shown may include sublayers and/or sub-components. In addition to the EAMR transducer 120, optional read transducer 122 is also shown. The read transducer 112 includes shields 114 and 118 as well as read sensor 116. In other embodiments, the read transducer 112 may be omitted.

The EAMR transducer 120 shown includes a shield 122, NFT 124, coils 130 and 132, pole 134, and waveguide 140. The shield 122 may also be considered a return pole. Further, the shield 122 may include a soft magnetic material such as NiFe. The coils 130 and 132 may be helical coils. In other embodiments, the coils 130 and 132 may be pancake coils having the connection (not shown). The NFT 124 may include a disk portion 126 and a pin portion 128. However, in another embodiment, another type of NFT 124 may be used. The NFT 124 is in proximity to the ABS and is used to focus light from the laser 104 onto the media 108. The pole 134 includes pole tip 136 and back gap region 138. In other embodiments, the pole 134 may have different and/or additional components. The pole 134 also includes ferromagnetic materials. When energized by the coil(s) 130 and 132, the pole 134 generates a magnetic field to write to a region of the media 108.

The EAMR transducer 120 also includes optics 124, 140 and 150. In particular, a waveguide 140 and NFT 124 are used. In some embodiments, a grating (not shown) may couple light from the laser 104 into the waveguide 140. The waveguide 140 directs the energy from the laser 104 toward the ABS at an incident angle, θ, which is less than ninety degrees. At least a portion of the energy directed by the waveguide 150 reflects off of the ABS, away from the media (not shown in FIGS. 3A and 3B) and toward the reflective grating 150. The NFT 124 resides between the incident portion of the waveguide 150 and the reflective grating 150.

As can be seen in FIG. 3B, the waveguide 140 directs the energy toward the ABS and NFT 124. More specifically, the waveguide 140 has a tapered mode converter 142 that squeezes the mode supported by the waveguide 140 to a smaller spot size. The remaining portion of the waveguide 140, an "S" shape 144, directs the light around the pole 136, particularly around the back gap 138 and toward the NFT 124. The waveguide 140, and thus the light carried by the waveguide, approach the ABS and the NFT 124 at an incident angle. The incident angle is greater than zero and less than ninety degrees. In general, the incident angle is desired to be as small as possible to reduce leakage through the ABS, while achieving total internal reflection as described below. Typically, this corresponds to an incident angle of less than sixty degrees.

In some embodiments, the energy from the laser 104 is desired to undergo total internal reflection at the ABS. To undergo total internal reflection, the incident angle, θ, is the critical angle for the light energy. In such an embodiment, substantially all of the energy from the laser is transferred to the reflective grating 150. However, in practice, the incident angle, θ, of the waveguide 140 is not greater than the critical angle. In some embodiments, the critical angle is at least fifty six degrees and not more than seventy-one degrees. However, in other embodiments in which the waveguides have different indices of refraction, the critical angles may be different. Thus, in some embodiments the incident angle is at least twenty degrees and not more than sixty-five degrees. In some such embodiments, the incident angle is at least thirty and not more than fifty degrees. The portion of the waveguide 140 between the NFT 124 and the reflective grating 150 is generally desired to be symmetric with the portion of the waveguide 140 carrying light incident to the NFT 124. However in other embodiments, the portions of the waveguide 150 need not be symmetric.

The reflective grating 150 receives the reflected energy at a reflected angle. In the embodiment shown, the reflected angle is the same as the incident angle. However, in other embodiments, the angle of incidence for the reflected energy is different from the reflected angle. The reflective grating 150 reflects energy back toward the ABS and, therefore, the NFT 124. Because the reflective grating 150 is used, light may be recycled to the NFT 124. When light is recycled by the reflective grating 150, it is reflected back to the NFT 124 and has another opportunity to be coupled into the NFT 124 and the media 108. The light may be more likely to reach the media. Thus, optical efficiency of the NFT 124 and the EAMR transducer 120 may be improved.

Figure 4:
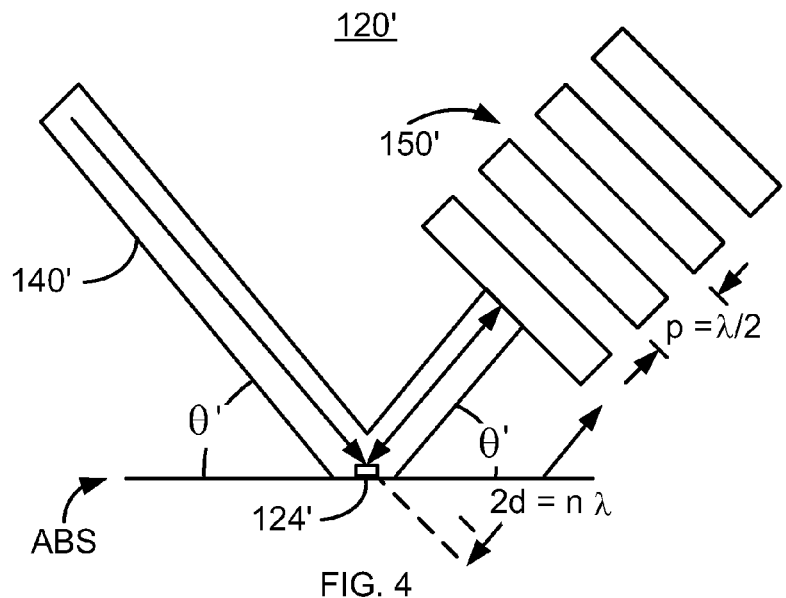
FIG. 4 is a diagram depicting an exemplary embodiment of a portion of the EAMR transducer near the NFT.
Figure 5:
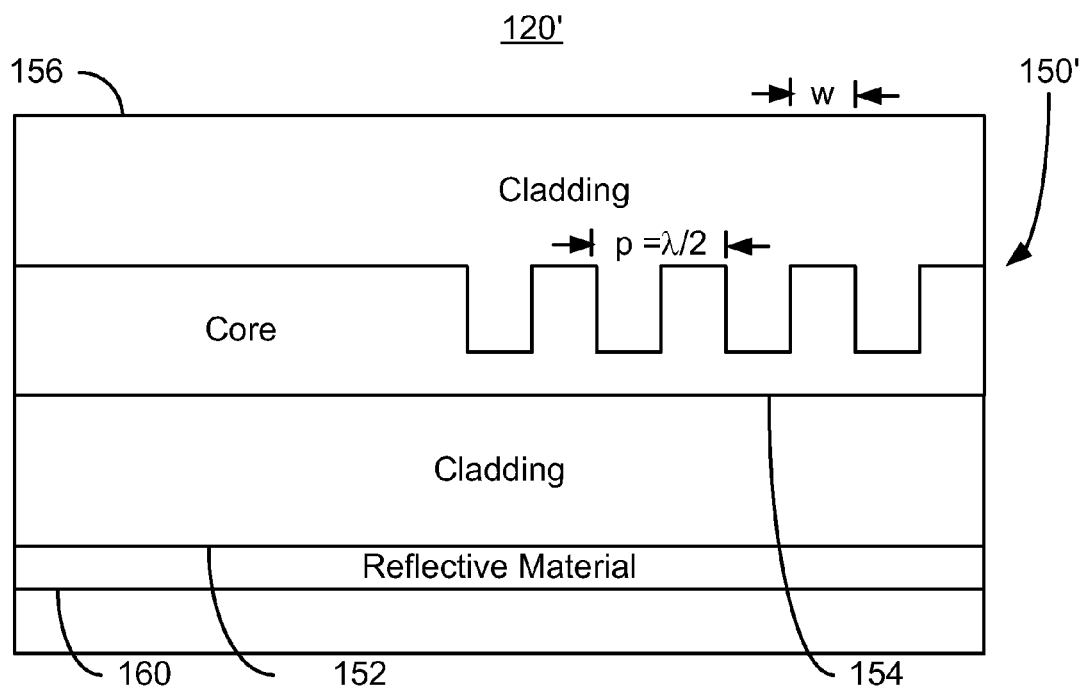
FIG. 5 is a diagram depicting an exemplary embodiment of a portion of the EAMR transducer.

FIGS. 4 and 5 depict exemplary embodiments of an EAMR transducer 120' usable in the EAMR head 110 and disk drive 100. For simplicity, FIGS. 4 and 5 are not to scale. FIGS. 4 and 5 depict a closer view of the region around the NFT 124'. The EAMR transducer 120' is analogous to the EAMR transducer 120. Analogous components are, therefore, labeled similarly. The EAMR transducer 120' thus includes an NFT 124', waveguide 140', and reflective grating 150' that are analogous to the NFT 124, waveguide 140, and reflective grating 150, respectively. Note that a portion of the waveguide 140' in the grating 150' is depicted in FIG. 4 by dashed lines. In the embodiment shown, the waveguide 140' extends beyond the reflective grating 150'. However, in another embodiment, the waveguide 140' may terminate at another location. The reflective grating 150' is formed of cladding 152 and 156 that sandwich core 154. The interface between the cladding 156 and the core has a pitch, p. The waveguide 140' is configured such that light (shown by an arrow in the waveguide 140 in FIG. 4) is incident to the ABS and NFT 124' at angle θ'. In some embodiments, θ' is the critical angle, such that the light undergoes total internal reflection. Thus, substantially all of the light from the laser 108 incident to the ABS is reflected to the reflective grating 150'. However, in other embodiments, the incident angle θ' is not the critical angle. The reflective grating 150' reflects the light back toward the ABS and NFT 124'. This is shown by the two sided arrow in the waveguide 140'.

The reflective grating 150' is a first order grating. Thus, the reflectivity of the grating 150 is based on first order Bragg reflections. Stated differently, suppose that the energy from the laser 108 has an effective wavelength, λ, in the reflective grating 150'. The pitch, p, of the reflective grating 150' is substantially equal to half the effective wavelength (p=λ/2). For example, for an effective wavelength of four hundred nanometers, the pitch is approximately two hundred nanometers. In some embodiments, the pitch has a tolerance of substantially two percent. In some such embodiments, the reflective grating 150' has a duty cycle of substantially fifty percent. In the example above, with pitch of two hundred nanometers, the width of each line (w) is approximately one hundred nanometers. The duty cycle may have a tolerance of substantially three percent.

The EAMR transducer 120' may have improved efficiency. The reflective grating 150' recycles light reflected from the ABS and not initially coupled into the NFT 124'. This light may reflect back to the NFT 124' to have another opportunity to be coupled into the media 108. Further, the reflective grating 150' is a first order grating. As a result, the reflective grating 150' has a larger bandwidth. In some embodiments, the bandwidth is at least thirty nanometers. In some such embodiments, the bandwidth may be at least forty nanometers. Because the reflective grating 150' has such a large bandwidth, variations in the effective wavelength due to a raised temperature and other environmental conditions during operation may not significantly affect operation of the reflective grating 150'. As a result, the grating 150' may be capable of recycling light over the operating range of effective wavelengths. Efficiency of the NFT 124/124' and the EAMR transducer 120/120' may thus be enhanced.

Figure 6:
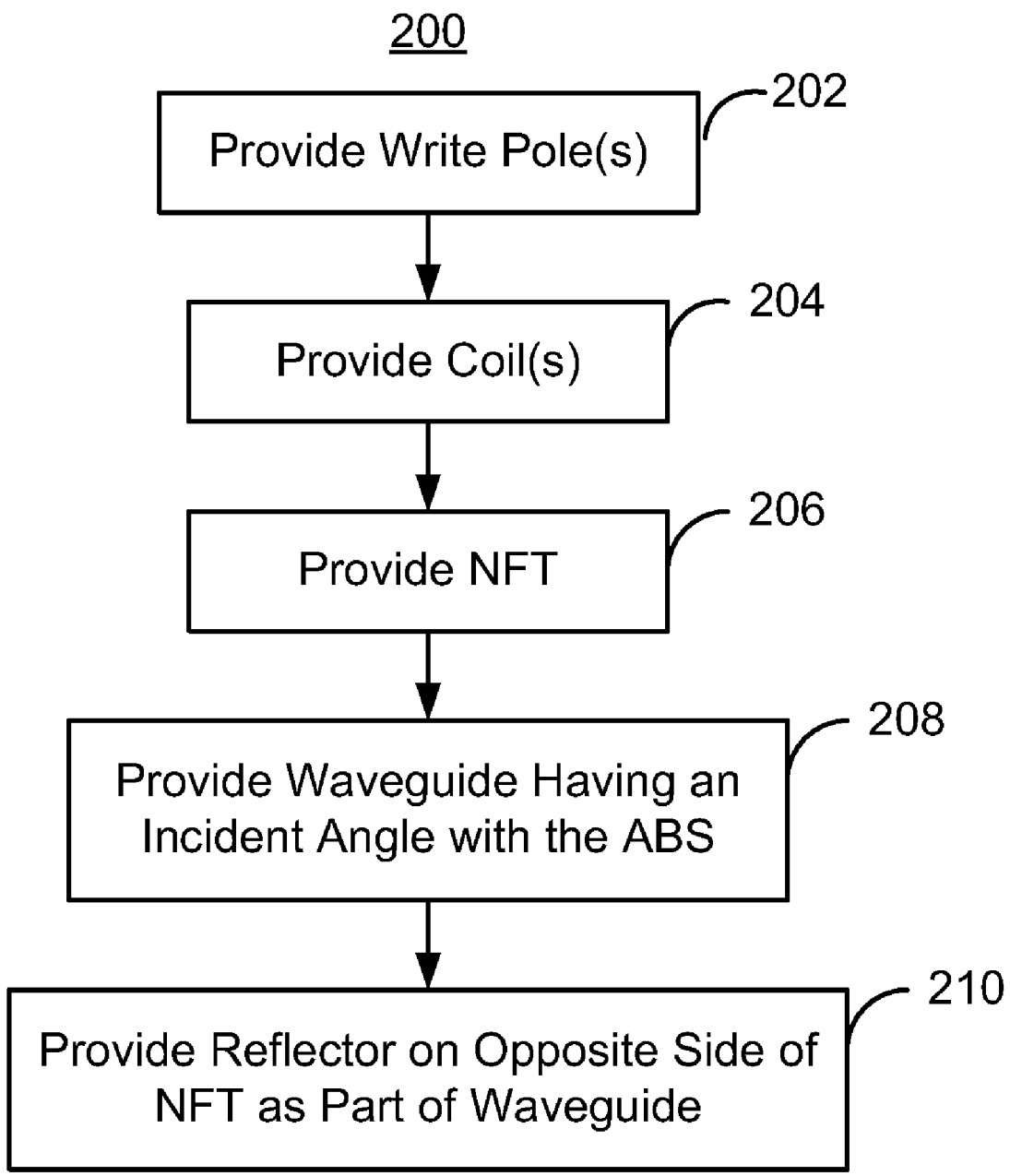
FIG. 6 is a flow chart depicting an exemplary embodiment of a method for fabricating an EAMR transducer.

FIG. 6 depicts an exemplary embodiment of a method 200 of forming a portion of an EAMR head. For simplicity, some steps may be omitted, combined, and/or performed in another sequence. The method 200 is described in the context of the EAMR disk drive 100 and EAMR head 110. However, the method 200 may be used to fabricate other EAMR heads. In addition, the method 200 is described in the context of fabricating a single disk drive 100. However, multiple transducers may be fabricated substantially in parallel. Further, although described as separate steps, portions of the method 200 may be interleaved.

The write pole 134 and its constituents are provided, via step 202. The coil(s) 130 and/or 132 for energizing the pole 134 are also provided in step 204. The NFT 124 is also fabricated, via step 206. The waveguide 140/140' is provided, via step 308. Finally, the reflective grating 150/150', which may be a first order grating, is formed to receive light from the waveguide 140'/140", via step 310. Using the method 200, the EAMR transducer 100 and/or 110' and reflective grating 150/150' may be obtained. Consequently, the benefits of such devices may be achieved.

We claim:

1. An energy assisted magnetic recording (EAMR) transducer coupled with a laser for providing energy and having an air-bearing surface (ABS) configured to reside in proximity to a media during use, the EAMR transducer comprising:
   a write pole configured to write to a region of the media;
   at least one coil for energizing the write pole;
   a near field transducer (NFT) proximate to the ABS and for focusing the energy onto the region of the media;
   a waveguide configured to direct the energy from the laser toward the NFT at an incident angle with respect to the ABS, a first portion of the energy reflecting off of the ABS at a reflected angle; and
   a reflective grating configured to receive the first portion of the energy at the reflected angle from the ABS and to reflect a second portion of the energy toward the ABS, the NFT residing between at least a portion of the waveguide and the reflective grating.

2. The EAMR transducer of claim 1 wherein the reflective grating is a first order grating.

3. The EAMR transducer of claim 1 wherein the energy has an effective wavelength in the reflective grating and wherein the reflective grating has a pitch substantially equal to half the effective wavelength.

4. The EAMR transducer of claim 3 wherein the reflective grating includes a first cladding, a core, and a second cladding, an interface between the core and the second cladding having the pitch.

5. The EAMR transducer of claim 4 wherein the pitch has a tolerance of substantially two percent.

6. The EAMR transducer of claim 4 wherein the reflective grating has a duty cycle of substantially fifty percent.

7. The EAMR transducer of claim 1 wherein the incident angle is not more than a critical angle, the critical angle being such that the energy undergoes total internal reflection at the ABS.

8. The EAMR transducer of claim 1 wherein the reflective grating has a bandwidth of at least thirty nanometers.

9. The EAMR transducer of claim 1 wherein the incident angle is substantially the same as the reflected angle.

10. An energy assisted magnetic recording (EAMR) transducer coupled with a laser for providing energy and having an air-bearing surface (ABS) configured to reside in proximity to a media during use, the EAMR transducer comprising:
    a write pole configured to write to a region of the media;
    at least one coil for energizing the write pole;
    a near field transducer (NFT) proximate to the ABS and for focusing the energy onto the region of the media;
    a waveguide configured to direct the energy from the laser toward the NFT at an incident angle with respect to the ABS, a first portion of the energy reflecting off of the ABS at a reflected angle; and
    a first order reflective grating configured to receive the first portion of the energy at the reflected angle from the ABS and to reflect a second portion of the energy toward the ABS, the NFT residing between at least a portion of the waveguide and the first order reflective grating, the energy having an effective wavelength in the reflective grating, the first order reflective grating including a bottom cladding, a core, and a top cladding, an interface between the core and the top cladding having a pitch, the pitch substantially equal to half the effective wavelength, the pitch having a tolerance of substantially two percent and a duty cycle of substantially fifty percent, the first order reflective grating having a bandwidth of at least thirty nanometers.

11. An energy assisted magnetic recording (EAMR) disk drive comprising:
    a media for storing data;
    a slider having an air-bearing surface (ABS) configured to reside in proximity to the media during use;
    a laser coupled with the slider for providing energy;
    an EAMR transducer coupled with the slider and including a write pole, at least one coil, a near field transducer (NFT), a waveguide, and a reflective grating, the write pole configured to write to a region of the media, the at least one coil for energizing the write pole, the NFT being proximate to the ABS and for focusing the energy onto the region of the media, the waveguide configured to direct the energy from the laser toward the NFT at an incident angle with respect to the ABS, a first portion of the energy reflecting off of the ABS at a reflected angle, the reflective grating configured to receive the first portion of the energy at the reflected angle from the ABS and to reflect a second portion of the energy toward the ABS, the NFT residing between at least a portion of the waveguide and the reflective grating.

12. The EAMR disk drive of claim 11 wherein the reflective grating is a first order grating.

13. The EAMR disk drive of claim 11 wherein the energy has an effective wavelength in the reflective grating and wherein the reflective grating has a pitch substantially equal to half the effective wavelength.

14. The EAMR disk drive of claim 13 wherein the reflective grating includes a first cladding, a core, and a second cladding, an interface between the core and the second cladding having the pitch.

15. The EAMR disk drive of claim 14 wherein the pitch has a tolerance of substantially two percent.

16. The EAMR disk drive of claim 14 wherein the reflective grating has a duty cycle of substantially fifty percent.

17. The EAMR disk drive of claim 11 wherein the incident angle is not more than a critical angle, the critical angle being such that the energy undergoes total internal reflection at the ABS.

18. The EAMR disk drive of claim 11 wherein the reflective grating has a bandwidth of at least thirty nanometers.

19. The EAMR disk drive of claim 11 wherein the incident angle is substantially the same as the reflected angle.

20. A method for providing an energy assisted magnetic recording (EAMR) transducer coupled with a laser for providing energy and having an air-bearing surface (ABS) configured to reside in proximity to a media during use, the EAMR transducer comprising:
    providing a write pole configured to write to a region of the media;
    providing at least one coil for energizing the write pole;
    providing a near field transducer (NFT) proximate to the ABS and for focusing the energy onto the region of the media;
    providing a waveguide configured to direct the energy from the laser toward the NFT at an incident angle with respect to the ABS, a first portion of the energy reflecting off of the ABS at a reflected angle; and
    providing a reflective grating configured to receive the first portion of the energy at the reflected angle from the ABS and to reflect a second portion of the energy toward the ABS, the NFT residing between at least a portion of the waveguide and the reflective grating.

* * * * *